United States Patent
Davis

(10) Patent No.: US 8,692,996 B2
(45) Date of Patent: Apr. 8, 2014

(54) SYSTEM AND METHOD FOR DETERMINING THE STATE OF A TRAFFIC SIGNAL

(75) Inventor: Clint A. Davis, Houston, TX (US)

(73) Assignee: Mesa Engineering, Inc., Houston, TX (US)

( * ) Notice: Subject to any disclaimer, the term of this patent is extended or adjusted under 35 U.S.C. 154(b) by 201 days.

(21) Appl. No.: 13/192,762

(22) Filed: Jul. 28, 2011

(65) Prior Publication Data
US 2013/0027704 A1    Jan. 31, 2013

(51) Int. Cl.
*G01J 3/46*    (2006.01)
*G01N 21/25*   (2006.01)
*G01N 21/00*   (2006.01)

(52) U.S. Cl.
USPC ............. 356/402; 356/405; 356/406; 356/72; 356/73

(58) Field of Classification Search
USPC ............... 356/402, 405–406, 72–73
See application file for complete search history.

(56) References Cited

U.S. PATENT DOCUMENTS

| | | | |
|---|---|---|---|
| 2,871,088 A * | 1/1959 | Abell | 346/107.2 |
| 5,801,808 A * | 9/1998 | Abraham et al. | 351/221 |
| 5,912,822 A | 6/1999 | Davis et al. | |
| 5,929,787 A | 7/1999 | Mee et al. | |
| 5,935,190 A * | 8/1999 | Davis et al. | 701/119 |
| 5,948,038 A | 9/1999 | Daly et al. | |
| 6,333,701 B1 | 12/2001 | Mee et al. | |
| 2002/0060640 A1 | 5/2002 | Davis et al. | |
| 2008/0094250 A1* | 4/2008 | Myr | 340/909 |
| 2010/0245125 A1 | 9/2010 | Wike, Jr. et al. | |

FOREIGN PATENT DOCUMENTS

WO    WO2010097211    * 9/2010

* cited by examiner

*Primary Examiner* — Tarifur Chowdhury
*Assistant Examiner* — Sunghee Y Gray
(74) *Attorney, Agent, or Firm* — Conley Rose, P.C.

(57) ABSTRACT

A system and method for determining a state of a traffic signal. In one embodiment, a traffic signal state detector includes a lens, a color sensor, and a processor. The color sensor is configured to identify a plurality of colors of light directed to the color sensor by the lens, and a field of view of the color sensor is restricted based on dimensions of a traffic signal. The processor is coupled to the color sensor. The processor is configured to determine a color of light emitted by the traffic signal based on the colors of light identified by the color sensor.

11 Claims, 4 Drawing Sheets

SYSTEM AND METHOD FOR DETERMINING THE STATE OF A TRAFFIC SIGNAL

BACKGROUND

A traffic signal is a light emitting device positioned at a roadway intersection to control the flow of traffic. The traffic signal alternately assigns the right-of-way to traffic moving through the intersection in a particular direction. Information regarding the assignment of right of way is generally communicated via the color of light emitted by the traffic signal.

Various traffic control strategies utilize traffic signal state information to direct operations of a traffic control system. For example, a traffic control signal may be programmed to change state a predetermined time interval after an adjacent signal changes state. In another example, a signal violation system may be triggered when traffic signal state information indicates withdrawal of right of way for particular traffic (e.g., the traffic signal is red in direction of the particular traffic), and a vehicle lacking right of way enters the intersection.

One traffic signal state sensing technique uses a wired connection to the traffic signal to determine signal state. The wired connection requires the installation of buried or overhead cable with the attendant expense. Other traffic signal state monitoring systems use an imaging system (i.e., a camera) to optically detect the state of a monitored traffic signal. Such systems examine a portion of each captured image to ascertain the state of the traffic signal. Limited frame rates, transfer rates between the imaging sensor and an image-processing computer, and processing latencies result in low operational speeds for image based detectors. Moreover, movement of the monitored traffic signal, due to wind for example, can result in errors in signal state determination. Consequently, improvements in traffic signal state determination systems and methods are desirable.

SUMMARY

A system and method for determining a state of a traffic signal. In one embodiment, a traffic signal state detector includes a lens, a color sensor, and a processor. The color sensor is configured to identify a plurality of colors of light directed to the color sensor by the lens, and a field of view of the color sensor is restricted based on dimensions of a traffic signal. The processor is coupled to the color sensor. The processor is configured to determine a color of light emitted by the traffic signal based on the colors of light identified by the color sensor.

In another embodiment, a method for determining a state of a monitored traffic signal includes directing, via a lens, a plurality of colors of light to a color sensor. A field of view of the color sensor is limited to an area defined by a location and dimensions of the monitored traffic signal. A state of the monitored traffic signal is determined based on relative luminosity of light colors emitted by the monitored traffic signal and detected by the color sensor of the plurality of colors of light directed to the color sensor.

In a further embodiment, a traffic management system includes a first traffic signal, a traffic signal state detection system, and a traffic control system. The traffic signal state detection system is configured to optically monitor the first traffic signal and to determine a state of the first traffic signal. The traffic control system is coupled to the traffic signal state detection system. The traffic signal state detection system includes an aperture plate configured to restrict color detection to light gathered from a predetermined area based at the first traffic signal. The predetermined area is based on a size and predicted motion of the traffic signal.

In yet another embodiment, an apparatus includes a lens, an aperture plate, a color sensor, and a processor. The aperture plate is disposed so that light from the lens passes through an aperture in the aperture plate. The color sensor configured to detect colors of light passing through the aperture and to generate a signal indicating an intensity of each of the detected colors of light. The processor is coupled to the color sensor for processing the signal.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
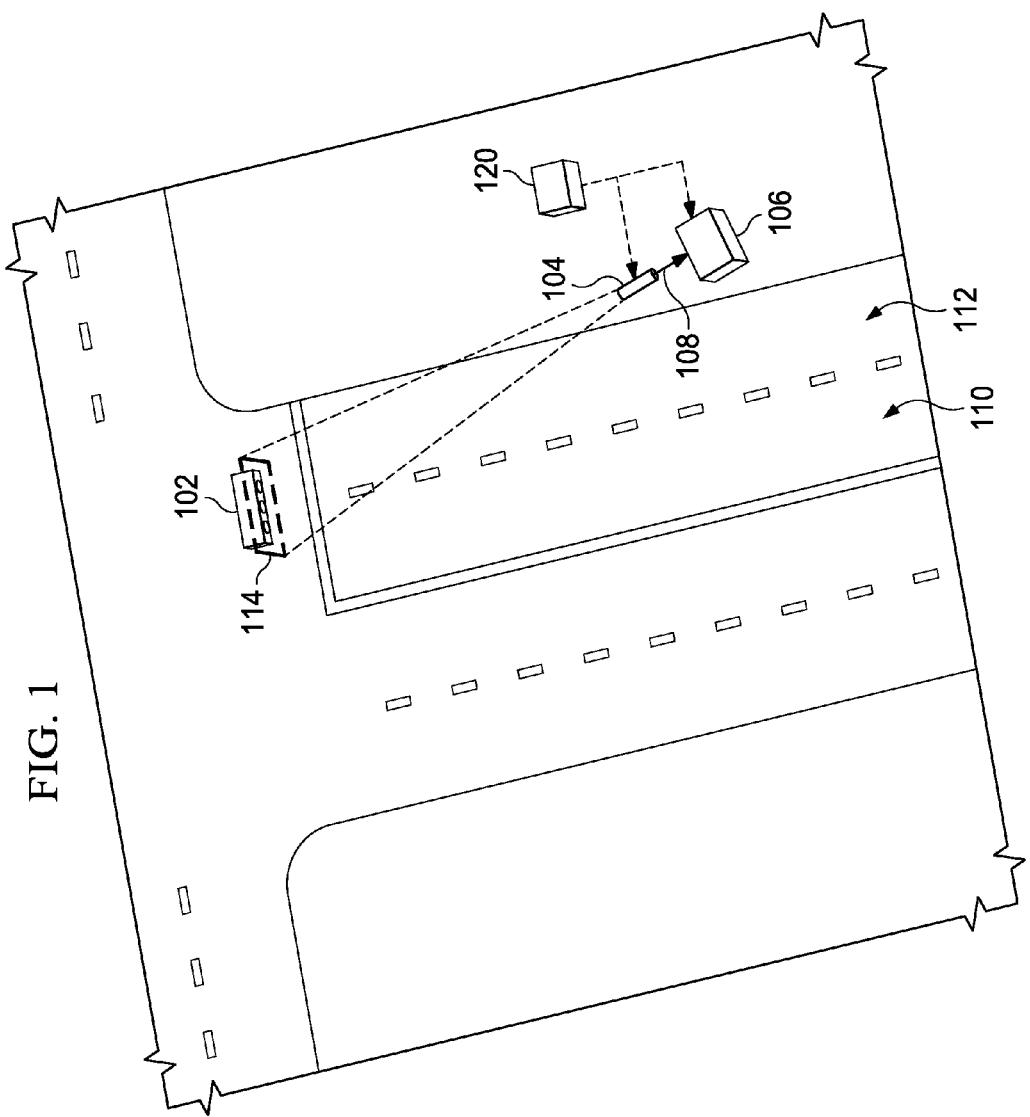
FIG. 1 is a schematic plan view showing a traffic signal monitored by a traffic signal state determination system in accordance with various embodiments.

Certain terms are used throughout the following description and claims to refer to particular system components. As one skilled in the art will appreciate, companies may refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Traffic signal state information may be provided as a control input to various traffic management systems (e.g., traffic signal synchronization systems, red light camera systems, etc.) Unfortunately, traffic signal state sensing systems based on image capture or wired connection to the monitored signal require costly installation and/or components. Furthermore, under some conditions, such systems may fail to correctly determine the state of the monitored traffic signal. For example, in low light, an optical imaging system configured to monitor an intersection may overexpose a portion of the image representing the traffic signal in order to adequately image darker areas of the intersection. Overexposure can result in a loss of color accuracy, requiring application of non-color based techniques (e.g., signal position based techniques) to determine the signal's state. However, signal position based techniques are subject to failure when the traffic signal is in motion (e.g., in windy conditions).

Embodiments of the present disclosure include a traffic signal state determination system that uses a color sensor dedicated to monitoring the state of a traffic signal. Consequently, the disclosed system is not subject to the modes of failure characterizing imaging systems. Furthermore, the simplicity of the systems disclosed herein allow for a significant cost reduction over both wired and image based traffic signal state sensors known in the art.

FIG. 1 shows a traffic signal device 102 (which may be referred to herein simply as "traffic signal 102") monitored by a traffic signal state determination system 104 in accordance with various embodiments. The traffic signal 102 is positioned to manage traffic flow in lanes 110 and 112. The traffic signal state determination system 104 is positioned to detect light emitted from the traffic signal 102. In some embodiments, the traffic signal state determination system 104 is configured to detect light emitted within a region 114 of predetermined size encompassing the traffic signal 102. In some embodiments, the region 144 defines a range of space over which the traffic signal 102 is expected to move in the presence of wind. The traffic signal state determination system 104 employs a color sensor rather than an imaging sensor, and monitors light emitted only within a limited area around the traffic signal 102. Consequently, embodiments of the system 104 provide enhanced signal to noise ratio for light processed by the system 104, and improved traffic signal state determination at reduced cost when compared to imaging systems or wired systems. The traffic signal state determination system 104 may be disposed at any predetermined distance from the traffic signal 102, and includes lens systems configured to appropriately gather light emitted by the traffic signal 102 at the predetermined distance.

The traffic signal state determination system 104 is coupled to a traffic control system 106. A wired, wireless, or optical link 108 may be employed to transfer traffic signal 102 state information to the traffic control system 106. The traffic control system 106 may be, for example, a system for controlling a second traffic signal based on a state of the first traffic signal (e.g., a signal synchronization system), a system for controlling an image capture system based on a state of the first traffic signal (e.g., a red light camera system), etc.

The traffic signal state determination system 104 and/or the traffic control system 106 may be coupled to and powered by a power supply 120 which may be any of the AC power mains, batteries, photovoltaic cells, and/or another suitable power source.

Figure 2:
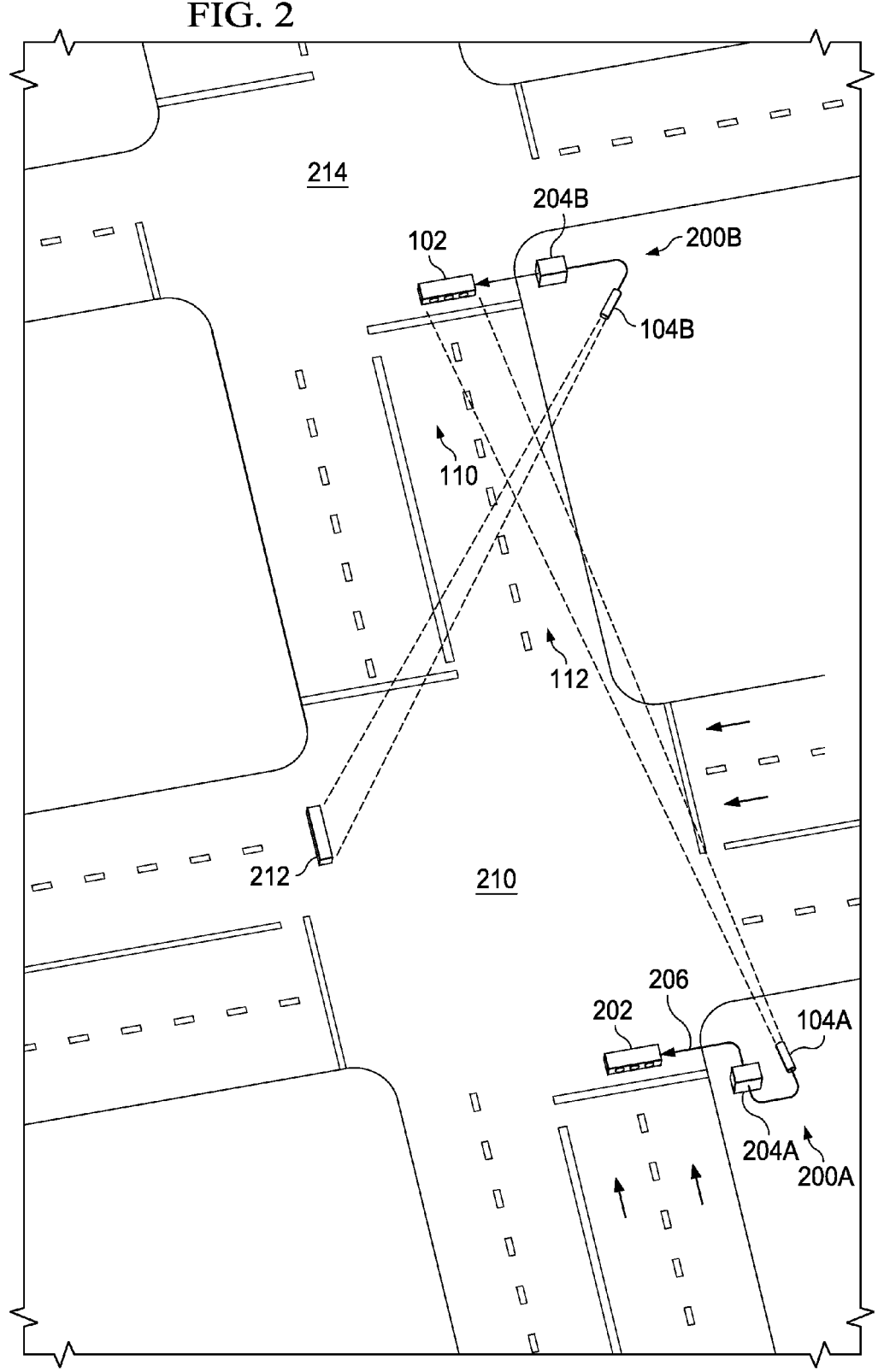
FIG. 2 is a schematic plan view showing traffic light synchronization using a traffic signal state determination system in accordance with various embodiments.

FIG. 2 shows a traffic signal synchronization system 200A that includes the traffic signal state determination system 104A. The traffic signal state determination system 104A may be equivalent to the system 104 described herein. As in FIG. 1, the traffic signal 102 is positioned to manage traffic flow in lanes 110 and 112. The traffic signal state determination system 104A is positioned to detect light emitted from the traffic signal 102 and to determine the state of the traffic signal 102 based on the detected light. In FIG. 2, the traffic signal 102 is located at intersection 214.

The traffic signal state determination system 104A is coupled to a traffic signal state controller 204A. The traffic signal state controller 204A controls the state of the traffic signal 202 located at intersection 210. The traffic signal state determination system 104A and the traffic signal state controller 204A may be disposed proximate to the traffic signal 202 at the intersection 210. By monitoring the state of the traffic signal 102, the traffic signal synchronization system 200 allows for synchronization of the traffic signals 102, 202 without wired or wireless communication between signal controllers 204A, 204B that control the states of the signals 102, 202. For example, if N seconds of green light overlap are desired between the traffic signals 102, 202 to facilitate traffic flow, then when the traffic signal state determination system 104A detects transition from red to green of the traffic signal 102, the traffic signal state controller 204A can initiate timing of the overlap and/or adjust the timing of the traffic signal 202 to eventually achieve the desired overlap and synchronization with the traffic signal 102. In this way the system 200 provides traffic signal synchronization while avoiding the installation of infrastructure required by conventional systems.

In traffic signal synchronization system 200B, a traffic signal state determination system 104B is coupled to a traffic signal state controller 204B that controls the traffic signal 102. The traffic signal state determination system 104B may be equivalent to the system 104 described herein. The traffic signal state determination system 104B is positioned to detect light emitted from the traffic signal 212 and to determine the state of the traffic signal 202 based on the detected light and a predetermined relationship between states of the traffic signals 212 and 202. Thus, knowing the state of the traffic signal 212, the traffic signal state controller 204B determines the state of the traffic signal 202, and synchronizes the state changes of the traffic signal 102 to the state changes of the traffic signal 202 without wired or wireless communication between the signal controllers 204A, 204B. Other embodiments may synchronize one traffic signal to another based on different traffic signals than those illustrated in FIG. 2 and/or include optical elements not shown in FIG. 2 (i.e., mirror, lenses, etc.) to transfer signal state information from a traffic signal to a traffic signal state determination system 104A, 104B.

Figure 3:
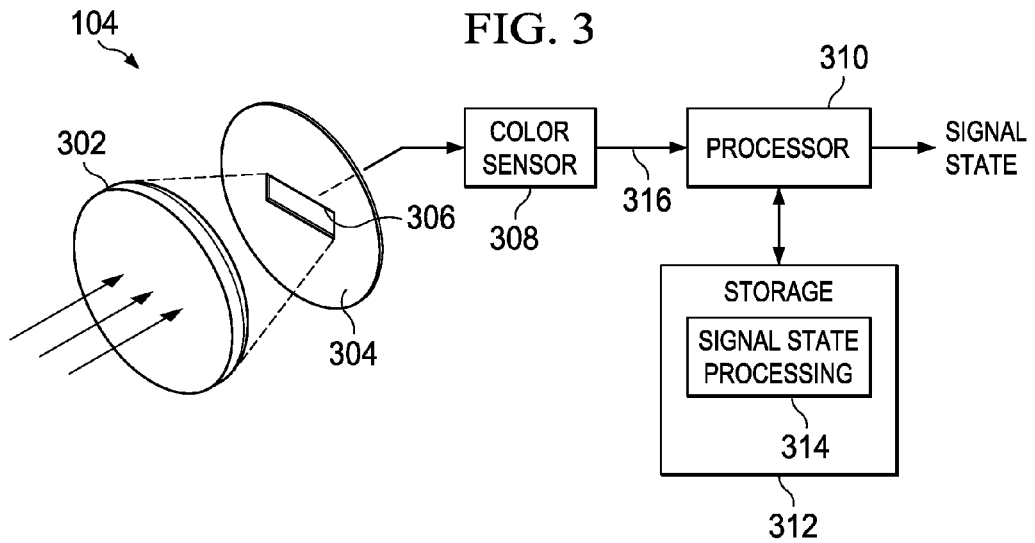
FIG. 3 is a block diagram showing a traffic signal state determination system in accordance with various embodiments.

FIG. 3 shows schematic diagram of a traffic signal state determination system 104 in accordance with various embodiments. The system 104 includes one or more lenses 302, an aperture plate 304, a color sensor 308, a processor 310, and storage 312. The lens(es) 302 collect light emitted by the traffic signal 102, and may include an achromatic lens to reduce chromatic aberration. Chromatic aberration (e.g., chromatic dispersion) in the lens(es) 302 may produce light colors that cause an erroneous indication of change in traffic signal state. Embodiments using an achromatic lens reduce or avoid such erroneous state change indications. In some embodiments, the lens(es) 302 include a cemented achromatic lens having 40 millimeter (mm) diameter and 60 mm focal length for optimally imaging a standard sized traffic signal 102 at a distance of 140 feet. Other embodiments include a cemented achromatic lens of different diameter and/or focal length and image a traffic signal at a different distance. The lens(es) 302 may be configured to form a refracting telescope thereby allowing the system 104 to be disposed a predetermined distance from the signal 102.

The aperture plate 304 is positioned behind the lens(es) 302. In some embodiments of the system 104, the aperture plate 304 is disposed at the focal point of the lens(es) 302. The aperture plate 304 includes an opening (i.e., an aperture) through which light gathered by the lens(es) 302 passes to illuminate the color sensor 308. The aperture 306 may approximate the traffic signal 102 in shape and may be dimensioned to allow only light emitted from a predetermined area surrounding the traffic signal 102 to illuminate the color sensor 308. For example, if the traffic signal 102 is rectangular in profile, then the aperture 306 may be a rectangular opening sized to allow only the image of the traffic signal 102 and a predetermined area around the traffic signal 102 to illuminate the color detector 308. In some embodiments of the aperture plate 304, the aperture 306 may be dimensioned to pass light emitted from an area approximately twice (e.g., ±50%) the width and approximately twice (e.g., ±50%) the height of the traffic signal 102 to the color sensor 308 (i.e., four times or approximately four times the area of the traffic signal 102), thereby allowing for motion of the traffic signal 102 while restricting received light to light emitted from the traffic signal and an area within which the traffic signal is expected to move. By limiting the light provided to the color sensor 308 to light emitted from a predetermined area around the traffic signal 102, the signal to noise ratio of the light illuminating the color sensor is enhanced, allowing the system 104 to reliably determine the state of the traffic signal 102 over distances that would make state determination problematic otherwise.

The color sensor 308 includes a plurality of photo detectors (e.g., photodiodes) and optical filters. In some embodiments, the color sensor 308 may include one or more photo detectors and optical filters tuned to detect red light, one or more photo detectors and optical filters tuned to detect green light, and one or more photo detectors and optical filters tuned to detect blue light. Other embodiments of the color sensor 308 may include photo detectors and optical filters tuned to detect different light colors (e.g., red, green, and yellow). Because the color sensor 308 is configured to capture only color information, rather than images, the photo detectors and optical filters of the color sensor 308 may be arranged in an irregular pattern that facilitates capture of color information in varying light patterns. In some embodiments of the traffic signal state determination system 104, the color sensor 308 may be a TSC230 produced by Texas Advanced Optoelectronic Solutions.

The color sensor 308 converts the light illuminating the sensor 308 to electrical signals 316 representative of the brightness of each color detected by the color sensor 308. The signals 316 do not represent or identify detection of different light colors at different areas of the color sensor 308 as would the signals provided by an image sensor, but rather the signals 316 are representative of the total brightness of each detected light color across the whole of the color sensor 308. The electrical signals 316 may be in analog or digital form. If the signals 316 are in analog form, then an analog-to-digital ("A/D") converter can be used to digitize the color signals 316. In some embodiments, the processor 310 may include one or more A/D converters for digitizing the color signals 316.

The processor 310 is configured to receive and process the color signals 316, to determine the state of the traffic signal 102, and to provide a signal output representative of the state of the traffic signal (e.g., red, green, or yellow light illuminated). The processor 310 may be a general-purpose processor, or a special-purpose processor such as a digital signal processor, a microcontroller, etc. Embodiments of the processor 310 generally include execution units (e.g., integer, fixed point, floating point, etc.), storage (e.g., registers, memory, etc.), instruction decoding and/or scheduling logic, clock systems, and interconnect systems (e.g., buses). Embodiments of the processor 310 may further include various peripheral devices, such as timers, A/D converters, serial and/or parallel communication controllers, etc. In some embodiments, the processor 310 may be a low power mixed signal processor such as the MPS430 processor produced by Texas Instruments, Inc.

The storage 312 is a computer readable medium and is coupled to the processor 310. The storage 312 may include one or more of volatile and/or non-volatile semiconductor memory (e.g., static/dynamic random access memory, read-only-memory, FLASH memory, etc.), magnetic storage (e.g., hard disk), or optical storage (e.g., compact disc, digital versatile disc, etc). Software programming executable by the processor 310 may be included in the storage 312 (e.g., the signal state processing 314). The storage 312 may also include data to be processed by the processor 310, and/or data produced as a result of operations performed by the processor 310. For example, color information extracted from the color signal 316 is stored in the storage 312 for processing, as is a state of the traffic signal 102 determined by applying the signal state processing 314 to the stored color information.

The signal state processing 314 comprises software instructions that when executed cause the processor 310 to determine the state of the traffic signal 102 based on the color information contained in the color signal 316. The signal state processing 314 may recognize a change in the state of the traffic signal 102 based on changes in the relative luminosity of the light colors detected by the color sensor 308. For example, the signal state processing 314 may identify a decrease in red light intensity followed by an increase in green light intensity, and determine based on the relative intensities of red and green light that the traffic signal 102 is now in the green state. Identification of other state transitions (e.g., green to yellow, yellow to red) may be determined in a similar fashion.

In some embodiments of the system 104, the signal state processing 314 may compute a hue, lightness, and saturation of light color detected by the color sensor 308 based on the color information provided via the color signal 316. In such embodiments, the state of the traffic signal 102 may be determined based on a value of hue computed from the color information provided by the color signal 316.

The system 104 can compute the state of the traffic signal 102 at sub-millisecond intervals. The color sensor 308 may continually, or at least at a much higher rate than an image sensor (e.g., thousands of times per second), provide new color information relevant to the traffic signal 102 to the processor 310. Because of the high rate of color information acquisition, embodiments of the system 104 reduce the latency of state change detection. Furthermore, when the intensity of the light emitted by the traffic signal 102 varies in time synchronization with the instantaneous phase of voltage of the AC mains powering the traffic signal 102, the fast sampling provided by the system 104 can detect the light intensity modulation and synchronize a traffic control system 106 coupled to the system 104 to the intensity modulation without being connected to the AC mains. For example, referring again to FIG. 1, the system 104 may track the light intensity modulation of the traffic signal 102 and indicate to the traffic control system 106 that the traffic signal 102 is (or will at a predetermined time be) at maximum brightness. The traffic control system 106 may thereafter trigger an image capture system to acquire an image (e.g., of a red light violation) at the time of maximum brightness of the traffic signal 102.

The signal state processing software 314 may also cause the processor to store information, for example, state timing information related to the time that the traffic light 102 spends in each state. The timing information may be based on, for example, an average time spent in each state over a predetermined interval. In some embodiments of the system 104, the processor 310 may apply such timing information to predict upcoming changes in the state of the traffic signal 102.

Figure 4:
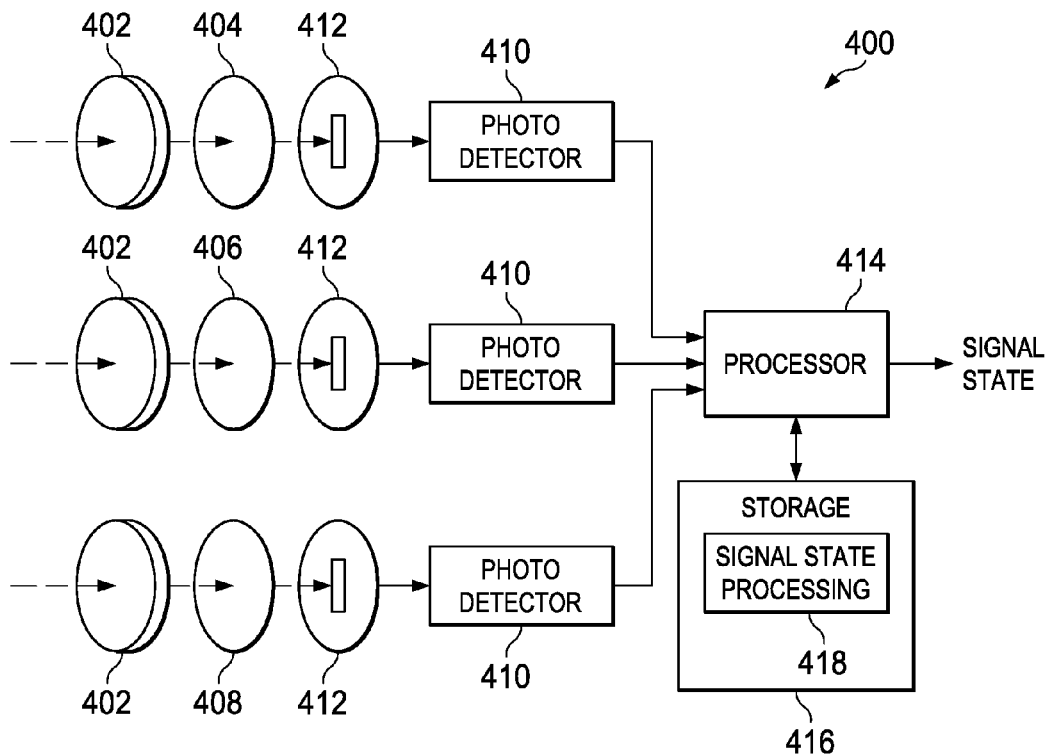
FIG. 4 is a block diagram showing a traffic signal state determination system using a lens per detector in accordance with various embodiments and FIG. 5 is a flow diagram for a method for traffic signal state determination in accordance with various embodiments.

FIG. 4 is a block diagram showing a traffic signal state determination system 400 using a lens per detector in accordance with various embodiments. The traffic signal state determination system 400 includes a plurality of lens systems 402, a plurality of optical filters 404-406, a plurality of photo detectors 410, and a plurality of aperture plates 412. Each lens system 402 includes one or more lenses that gather light emitted by a traffic signal (e.g., the traffic signal 102). Each optical filter 404-408 is configured to pass a predetermined range of wavelengths of light. For example, filter 404 may pass red light, filter 406 may pass yellow light, and filter 408 may pass green light.

In some embodiments of the system 400, each optical filter 404-408 may be integrated with another component. For example, in some embodiments, the optical filter 404 may be integrated with the lens system 402 to form a wave plate filter configured to pass a predetermined band of light wavelengths. In some embodiments, Newport wave plate filters, part numbers 10BPF10-630, 10BPF10-590, and 10BPF70-500 that pass wavelengths of light at 630, 590, and 500 nanometers respectively (corresponding nominally to red, green, and yellow traffic signal light colors) may be used.

Each lens system 402 in conjunction with an optical filter 404-408 provides light of predetermined wavelengths (i.e., red, yellow, or green) to an associated photo detector 310. As shown, a photo detector 410 is provided for each lens system 402. Some embodiments use a silicon photo detector such as part number P53-371 by Edmund Optics. Each photo detector 410 provides light intensity information to the processor 414 for use in determining a state of the traffic signal. For example, the signal state processing module 418 stored in storage 416 may be executed by the processor 414 to determine the state of the traffic signal based on the relative intensities of red, yellow, and green light detected by the photo detectors 410.

As shown in FIG. 4, an aperture plate 412 may be positioned between the lens system 402 and the photo detector 410 to limit light detected by the photo detector 410 to light emitted in a predetermined area encompassing the traffic signal 102. In the embodiment shown in FIG. 4, the aperture plate 404 is positioned between an optical filter 404-408 and a photo detector 410.

Figure 5:
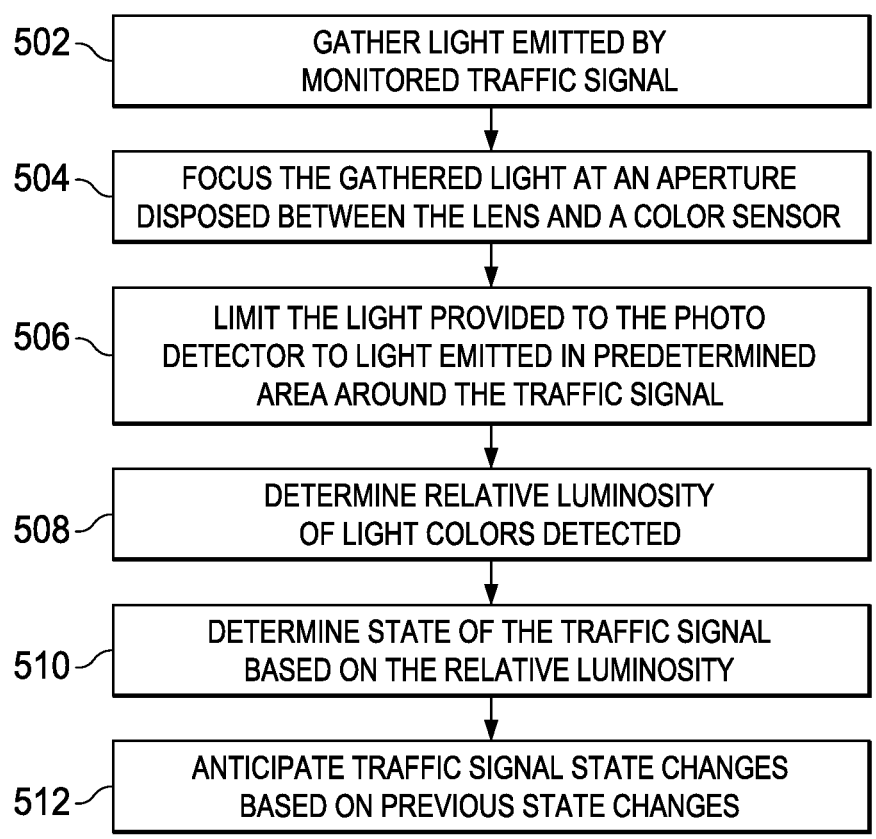

FIG. 5 shows a flow diagram for a method for traffic signal state determination in accordance with various embodiments. Though depicted sequentially as a matter of convenience, at least some of the actions shown can be performed in a different order and/or performed in parallel. Additionally, some embodiments may perform only some of the actions shown. At least some of the actions shown may be performed by a processor 310 executing software instructions retrieved from a computer readable medium (e.g., storage 312).

In block 502, the traffic signal 102 is operating and is emitting light that identifies the state of the traffic signal 102. The traffic signal state determination system 104 is monitoring the traffic signal 102. The lens(es) 302 gather light emitted by the monitored traffic signal 102. The lens(es) 302 may be configured to allow the system 104 to be positioned at any predetermined distance from the traffic signal 102. For example, the lens(es) 302 may be configured to gather light from an area of predetermined size at a predetermined distance.

In block 504, the lens(es) 302 focus the gathered light at an aperture plate 304 disposed between the lens(es) 302 and the color sensor 308. The aperture plate 304 includes an aperture 306 that may be formed in the general shape of the traffic signal 102, or another shape allowing for movement of the traffic signal while restricting the area from which light is received. In block 506, the aperture 306 limits the light provided to the color sensor 308 to light emitted from a predetermined area surrounding the traffic signal 102.

In block 508, the color sensor 308 generates electrical signals 316 corresponding to the intensity of colors of light illuminating the color sensor 308, and provides the electrical signals 316 to the processor 310. The processor 310 determines the relative luminosity of the light colors detected by the color sensor 308. The processor 310 may determine the hue, lightness, and saturation of the detected light based on the intensity of red, green, and blue light detected by the color sensor. Alternatively, the processor 310 may determine the relative luminosity of red, green, and yellow light (or other light colors) detected by the color sensor 308.

In block 510, the processor 310 determines the state of the traffic signal 102 based on the relative luminosity of the different colors of light detected by the color sensor 308. For example, if red light intensity decreases and green light intensity increases, then the processor 310 may determine that the traffic signal 102 is in green state.

In block 512, the processor 310 anticipates state changes in the traffic signal 102 based on its observation and analysis of previous state changes. The processor 310 may track state changes and compile statistical information indicative of the timing of prior state changes. Thus, if the statistical information indicates that the traffic signal 102 generally maintains a yellow state for three seconds, then the processor 102 may anticipate and watch for a change from yellow state to red state after the traffic signal 102 has been in the yellow state for 2.5 seconds.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A traffic signal state detector, comprising:
   a lens;
   a color sensor configured to identify a plurality of colors of light directed to the color sensor by the lens;
   an aperture plate disposed between the lens and the color sensor, the aperture plate comprising an aperture having a shape and orientation corresponding to a traffic signal to be monitored by the traffic signal state detector, wherein the lens is configured to focus gathered light at the aperture; and
   a processor coupled to the color sensor, the processor configured to:
   determine a color of light emitted by the traffic signal based on the colors of light identified by the color sensor; and
   anticipate a change in state of the traffic signal based on a determined timing of previous state changes of the traffic signal.

2. The traffic signal state detector of claim 1, wherein the field of view of the color sensor is restricted by the aperture to a field approximately four times the area of the traffic signal.

3. The traffic signal state detector of claim 1, wherein the processor is configured to identify a state change of the monitored traffic signal within a maximum of approximately one millisecond after the state change.

4. The traffic signal state detector of claim 1, wherein the processor is configured to determine the color of light emitted by the traffic signal based on a relative luminosity of different light colors emitted by the monitored traffic signal and detected by the color sensor.

5. The traffic signal detector of claim 1, wherein the processor is configured to track modulation of intensity of light emitted by the monitored traffic signal, wherein the modulation is due to instantaneous phase of voltage of the power line powering the traffic signal.

6. A method for determining a state of a monitored traffic signal, comprising:
   directing, via a lens, a plurality of colors of light to a color sensor;
   limiting a field of view of the color sensor, via an aperture positioned between the lens and the color sensor, to an area defined by a location, shape, orientation, and dimensions of the monitored traffic signal;
   focusing light gathered by the lens at the aperture;
   determining a state of the monitored traffic signal based on relative luminosity of light colors emitted by the monitored traffic signal and detected by the color sensor of the plurality of colors of light directed to the color sensor; and
   anticipating a change in state of the monitored traffic signal based on a determined timing of previous state changes of the monitored traffic signal.

7. The method of claim 6, further comprising focusing gathered light at an aperture disposed between the lens and the color sensor.

8. The method of claim 6, further comprising providing traffic light state information updates at a rate of at least one update per millisecond.

9. The method of claim 6, wherein determining the state of the traffic signal comprises determining a hue, saturation, and lightness of a light color emitted by the monitored traffic signal and detected by the color sensor.

10. The method of claim 6, further comprising tracking modulation of intensity of light emitted by the monitored traffic signal, wherein the modulation is due to instantaneous phase of voltage of the power line powering the traffic signal.

11. An apparatus, comprising:
   a lens;
   an aperture plate disposed so that light from the lens passes through an aperture in the aperture plate, wherein the aperture is shaped and oriented in correspondence with a first traffic signal from which the lens gathers light, and the aperture is sized to be a multiple of the size of an image of a traffic signal provided by the lens at a predetermined distance from the first traffic signal;
   a color sensor configured to detect colors of light passing through the aperture and to generate a color signal indicating an intensity of each of the colors of light detected by a plurality of red photodetectors, a plurality of blue photodetectors, and a plurality of green photodetectors that are irregularly arranged on the color sensor;
   a processor coupled to the color sensor for processing the color signal; and
   a traffic signal controller coupled to the processor; wherein the signal controller is configured to synchronize a second traffic signal with the first traffic signal based on a state of the first traffic signal determined by the processor based on the color signal.

\* \* \* \* \*